United States Patent [19]
Stewart et al.

[11] Patent Number: 5,973,678
[45] Date of Patent: Oct. 26, 1999

[54] METHOD AND SYSTEM FOR MANIPULATING A THREE-DIMENSIONAL OBJECT UTILIZING A FORCE FEEDBACK INTERFACE

[75] Inventors: Paul Joseph Stewart, Brighton; Yifan Chen, Ann Arbor, both of Mich.; Pietro Buttolo, Mestre-Venezia, Italy

[73] Assignee: Ford Global Technologies, Inc., Dearborn, Mich.

[21] Appl. No.: 08/921,132

[22] Filed: Aug. 29, 1997

[51] Int. Cl.$^6$ ............................................. G09G 5/00
[52] U.S. Cl. ................... 345/184; 345/420; 345/433; 318/561
[58] Field of Search .................... 345/184, 156, 345/157, 161, 180, 433, 438, 427, 420, 424, 146, 158, 441; 395/92, 93, 500; 318/561, 628; 364/578

[56] References Cited

U.S. PATENT DOCUMENTS

| | | | |
|---|---|---|---|
| 5,448,687 | 9/1995 | Hoogerhyde et al. | 345/425 |
| 5,576,727 | 11/1996 | Rosenberg et al. | 345/179 |
| 5,625,576 | 4/1997 | Massie et al. | 364/578 |
| 5,694,013 | 12/1997 | Stewart et al. | 318/561 |

OTHER PUBLICATIONS

"Haptic Virtual Reality: Display of Operating Feel of Dynamic Virtual Objects", by Tsuneo Yoshikawa et al, Dept. of Mechanical Engineering, Kyoto University, Kyoto, Japan, Preprints of the 7th International Symposium of Robotics Research (ISRR'95), pp. 191–198 (1995) (Oct. 21–14, 1995, Munich, Germany).

"Force Feedback in Shared Virtual Simulations", by Pietro Buttolo et al, University of Washington, Universita' di Padova, The Boeing Company, presented at MICAD, France, 1996, pp. 1–6.

"Dextrous Virtual Work, A System for Visualizing and Manipulating Medical Images is Detailed, with Emphasis on Interaction Techniques", by Timothy Poston et al, Communications of the ACM, May 1966, vol. 39, No. 5, pp. 37–45.

"CAD Data Representations for Haptic Virtual Prototyping", by Paul Stewart et al, Ford Motor Company, Dearborn, MI, Submitted to ASME–CIE, 1997 (Revised), pp. 1–9.

"Haptic Rendering: Programming Touch Interaction with Virtual Objects", by K. Salisbury et al, Artificial Itnelligence Lab., Mass. Institute of Technology, Cambridge, MA, 1995 ACM, pp. 123–130.

"Impulse Engine 2000, Force Feedback Joystick", Specification Sheet of Immersion Corporation, San Jose, California.

"Virtual Environments and Advance Interface Design", by Blake Hannaford et al, Dept. of Electrical Engineering, University of Washington, Seattle, WA, pp. 1–30.

"1995 Computer Hardware & Electronics, See Me, Feel Me", Specification Sheets of SensAble Devices, SensAble Technologies, Inc., Cambridge, MA.

(List continued on next page.)

*Primary Examiner*—Richard A. Hjerpe
*Assistant Examiner*—Francis Nguyen
*Attorney, Agent, or Firm*—Paul K. Godwin; Roger L. May

[57] ABSTRACT

A method and system for manipulating a three-dimensional object in a computer-aided design (CAD) environment utilizes a force feedback interface. A gravitational sphere is defined around each of the plurality of input parameters of a mathematical model defining a shape, location and orientation of the object. A force is applied to the force feedback interface based on the gravitational spheres and the position of the force feedback interface. An input signal is received from the force feedback interface based on the applied force indicating selection of one of the plurality of input parameters. The selected input parameter can then be edited according to an edit signal generated by the user via the force feedback interface. In addition, the edit signal can be limited according to predetermined constraints via the force feedback interface.

20 Claims, 6 Drawing Sheets

OTHER PUBLICATIONS

"Calibration of Head–Mounted Displays for Augmented Reality Applications", by Adam L. Janin et al, Research & Technology, Boeing Computer Services, Seattle, WA, 1993 IEEE, pp. 246–255.

"Development of Surface Display", by Koichi Hirota et al, Dept. of Mechano–Informatics, Faculty of Engineering, University of Tokyo, Tokyo, Japan, 1993 IEEE, pp. 256–262.

"The Effect of Interocular Distance upon Operator Performance Using Stereoscopic Displays to Perform Virtual Depth Tasks", by Louis B. Rosenberg, Center for Design Research, Stanford University, Stanford, CA, 1993 IEEE, pp. 27–31.

"Touch and Trace on the Free–Form Surface of Virtual Objects", by Yoshitaka Adachi, Research & Development Center, Suzuki Motor Corporation, Yokohama, Japan, 1993 IEEE, pp. 162–168.

"The Phantom Haptic Interface: A Device For Probing Virtual Objects", by Thomas H. Massie et al, Dept. of Mechanical Engineering, Massachusetts Institute of Technology, Cambridge, Massachusetts, DSC–vol. 55–1, Dynamic Systems & Control: vol. 1, ASME 1994, pp. 295–301.

"Manipulation in Real, Virtual and Remote Environments", by Pietro Buttolo et al, University of Washington, Seattle, WA, Proceedings IEEE Conf. on System, Man & Cybernetics, vol. 5, pp. 4656–4661, Vancouver, BC, Oct. 1995, pp. 1–6.

METHOD AND SYSTEM FOR MANIPULATING A THREE-DIMENSIONAL OBJECT UTILIZING A FORCE FEEDBACK INTERFACE

TECHNICAL FIELD

This invention relates to methods and systems for manipulating three-dimensional objects in a Computer Aided Design (CAD) environment utilizing a force feedback interface.

BACKGROUND ART

In a CAD environment, the operator uses a combination of keyboard, mouse, and/or tablet to manipulate objects, and a flat screen to display visual feedback. This interface is very effective for 2 Degree-of-Freedom (DoF) drawings such as sections and projections, but has some major limitations for three-dimensional object design and manipulation.

In three-dimensional Cartesian space, position and orientation are defined by three positional coordinates X, Y and Z, and three angular coordinates, pitch, yaw and roll, for a total of 6 DoF. Designing, modeling, and assembling CAD surfaces and solid objects in space using a 2 DoF interface is non-intuitive, time consuming, and requires extensive training. In fact, position is controlled by three variables, but a mouse or tablet allows access to only two variables at a time (i.e. horizontal and vertical position in the plane of the mouse or tablet). Thus, a designer can control only a subset of positional information at any one time. Further, rotation about a given axis requires only one variable for definition. However, there is no rotational input available with the conventional tools. Thus, the designer must translate from a positional mouse displacement to a rotational displacement in order to understand the effect of their input.

A 6 DoF joystick, such as a Spaceball™ manufactured by Spaceball Technologies, provides six degrees of freedom. However, the six degrees of freedom do not match position and orientation. Rather, they match the speed at which those parameters are changed. The difference, which may seem subtle, is difficult to cope with and requires extensive training to become proficient.

The same objects modeled with a two-dimensional interface can also be modeled directly in three-dimensions. A virtual reality (VR) environment is one such example. In this case, the object is presented to the designer in a manner which more accurately mimics the presentation of an actual object. The object is placed in the same three-dimensional space as the designer. Thus, the designer would need an interface tool which has 6 DoF allowing position and orientation to be manipulated directly. Such an interface does not exist today.

DISCLOSURE OF THE INVENTION

It is thus a general object of the present invention to provide a method and system for selecting and editing a three-dimensional object in a CAD environment.

In carrying out the above object and other objects, features, and advantages of the present invention, a method is provided for manipulating a three-dimensional object in a computer-aided design (CAD) environment utilizing a force feedback interface. The method includes the step of defining a gravitational sphere around each of the plurality of input parameters of a mathematical model defining a surface of the object. The method also includes the step of applying a force to the force feedback interface based on the gravitational spheres. Still further, the method includes the step of receiving an input signal from the force feedback interface indicating selection of one of the plurality of input parameters based on the applied force. In addition, the method includes the step of editing the one input parameter according to an edit signal generated by the force feedback interface so as to edit the three dimensional object in the CAD environment.

In further carrying out the above object and other objects, features, and advantages of the present invention, a system is also provided for carrying out the steps of the above described method. The system includes a processor operative to define a gravitational sphere around each of the plurality of input parameters. The system also includes a controller for applying a force to the force feedback interface based on the gravitational spheres. The processor is further operative to receive an input signal from the force feedback interface indicating selection of one of the plurality of input parameters based on the applied force, and edit the one input parameter according to an edit signal generated by the force feedback interface.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
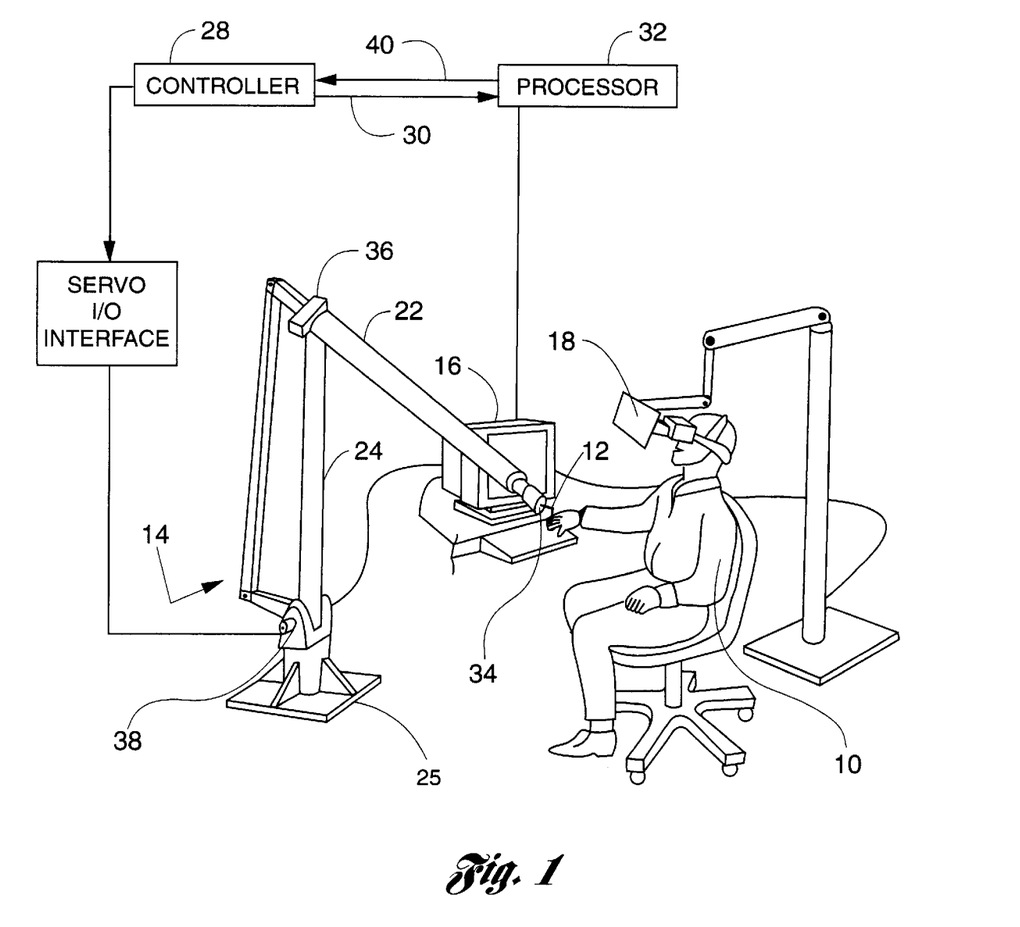
FIG. 1 is a perspective view of a human operator grasping a physical device, connected to a force actuation mechanism, for providing a haptic interface to a computer generated parametric surface.

Turning now to the drawings, and in particular to FIG. 1, a human operator 10 is seen grasping an end-effector 12, which is part of a force feedback interface 14, such as a haptic device. The force feedback interface 14 is electrically connected to a design station, which includes a computer and display screen 16 for generating a design form, typically through the use of conventional CAD, CAM or CAE programs. For purposes of this disclosure, the abbreviation "CAD" will be considered to encompass computer assisted design programs, including those from computer-aided manufacturing (CAM) and computer-aided engineering (CAE) facilities. The design form can be a surface which is displayed on the screen 16, or can be viewed in a virtual reality viewing device 18 which may attach directly to the head of the human operator 10.

A force feedback interface for generating the sensations of rigidity and facial roughness of virtual objects is provided through the end-effector 12, such as a stylus, pen, or any other similar mechanical gripped device. In automotive styling, for instance, the end-effector 12 in conjunction with the force feedback interface method of the present invention, enable the designer to touch, feel and edit complex, three-dimensional CAD geometry, thereby enhancing shape perception to the level that is, perhaps, only challenged by a physical prototype.

The force feedback interface 14 has the end-effector 12 attached to an upper arm 22, which in turn is attached to a lower arm 24. The lower arm 24 is joined to a base 25. The force feedback interface 14 is connected to a servo I/O interface 26, or other devices known to those skilled in the art and suggested by this disclosure, capable of transmitting forces to the end-effector 12 through the upper and lower arms 22, 24 in at least three degrees-of-freedom.

A controller 28 sends signals 30 to an electronic computer, or processor, 32, the signals 30 representing joint positions 34, 36 and 38 for the joints between the end-effector 12 and the upper arm 22, the upper arm 22 and the lower arm 24, and the lower arm 24 and the base 25, respectively. The processor 32 sends force signals 40 to the controller 28, which in turn controls the servo I/O interface 26 to produce the required forces at the force feedback interface, or haptic device, 14.

Figure 2:
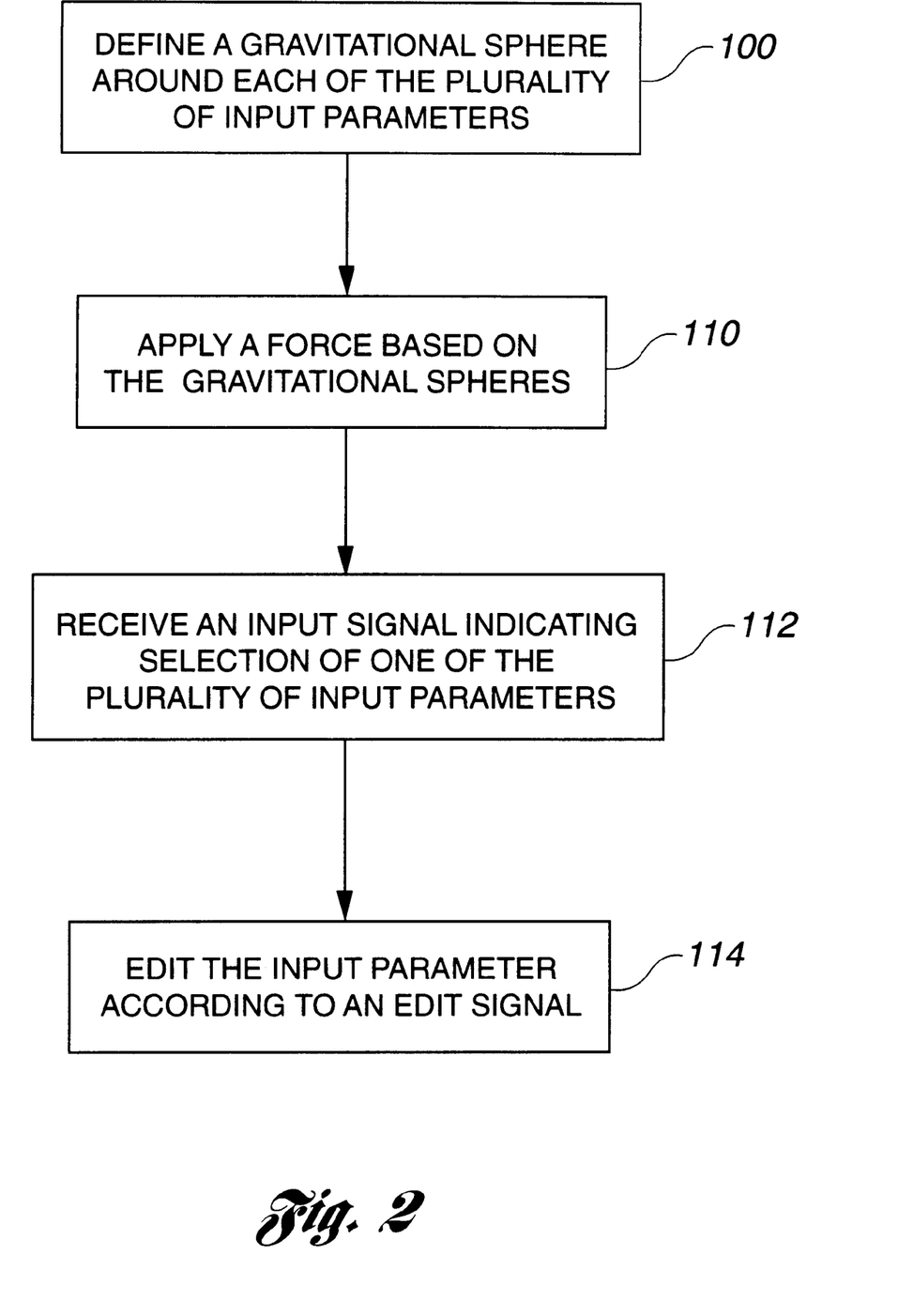
FIG. 2 is a flow diagram illustrating the general sequence of steps associated with the method of the present invention.
Figure 3A:
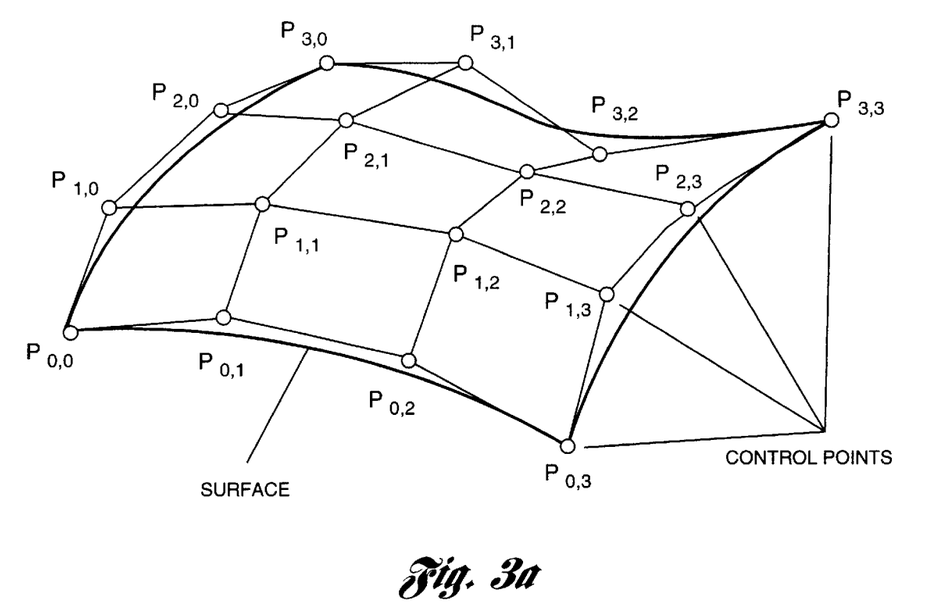
FIG. 3a is an example of an object modeled utilizing a NURBS surface.

Turning now to FIG. 2, there is shown a flow diagram illustrating the general sequence of steps associated with the method of the present invention. First, a gravitational sphere is defined around each of the plurality of input parameters associated with the object, as shown at block 100. A shape of an object is typically defined by a plurality of input parameters of a mathematical model. Although this method can be applied to any CAD data representation, for simplification purposes, the preferred method is described for a system in which objects are represented as a NURBS (Non-Uniform Rational B-Spline) surface that can be edited by moving control points. FIG. 3a illustrates an object represented as a NURBS surface defined by a plurality of control points, $P_{i,j}$. The positions of the control points define the shape of the surface.

Figure 3B:
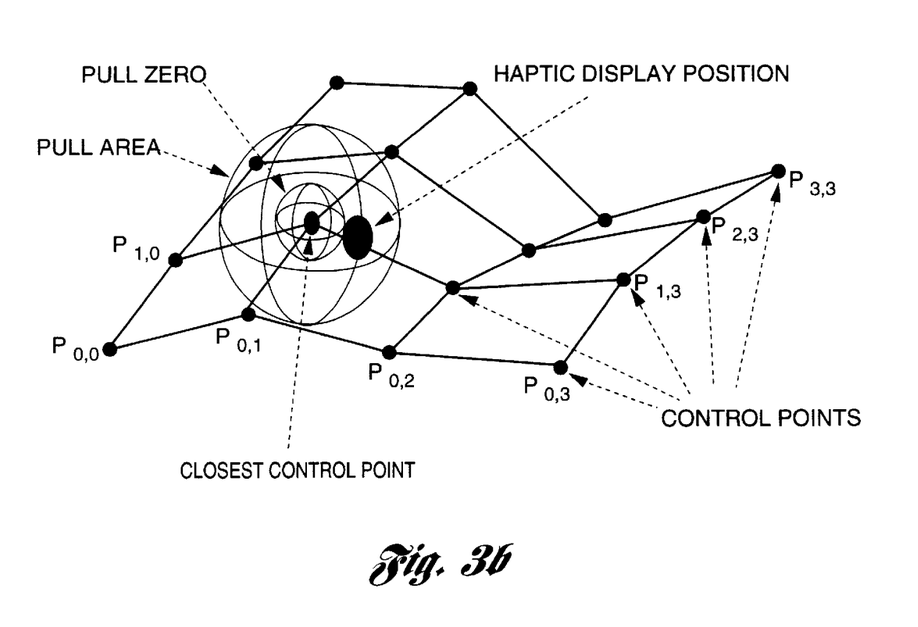
FIG. 3b is a schematic diagram of the control point network of the object modeled in FIG. 3a and a gravitational sphere around one control point.

FIG. 3b illustrates the control point network of the object modeled in FIG. 3a, including a related gravitational sphere according to the present invention. Although only one is shown in FIG. 3b, a gravitational sphere, Pull Area, is defined around each control point. The Pull Area gravitational sphere is defined according to a simple linear model. Force feedback is active only when the force feedback interface 14 is inside the Pull Area sphere. The closer the end-effector 12 is to a control point, the stronger the pull.

Figure 4:
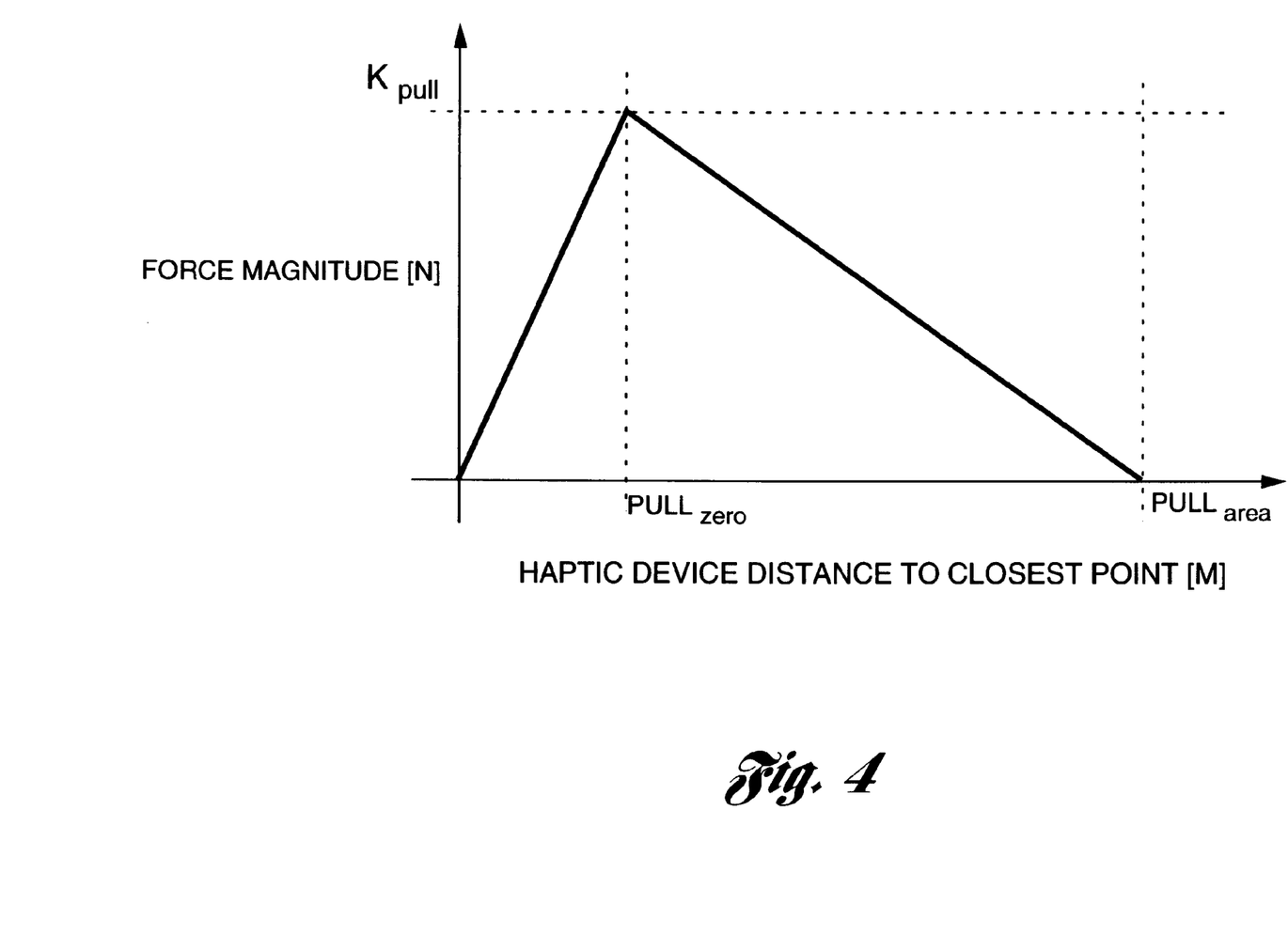
FIG. 4 is a graph illustrating the pulling function of the method of the present invention.

However, to ensure stability, a second sphere, Pull Zero, is defined within the Pull Area sphere in which the attracting force decreases, reaching a value zero when the end-effector 12 is touching the corresponding control point. FIG. 4 illustrates the pulling function of the present invention.

Based on the position of the end-effector 12 and the gravitational spheres, a force is applied to the force feedback interface 14, as shown at block 110. The method continues with the two main procedures: selecting an input parameter, or control point, and editing the control point, as shown at blocks 112 and 114, respectively.

Figure 5:
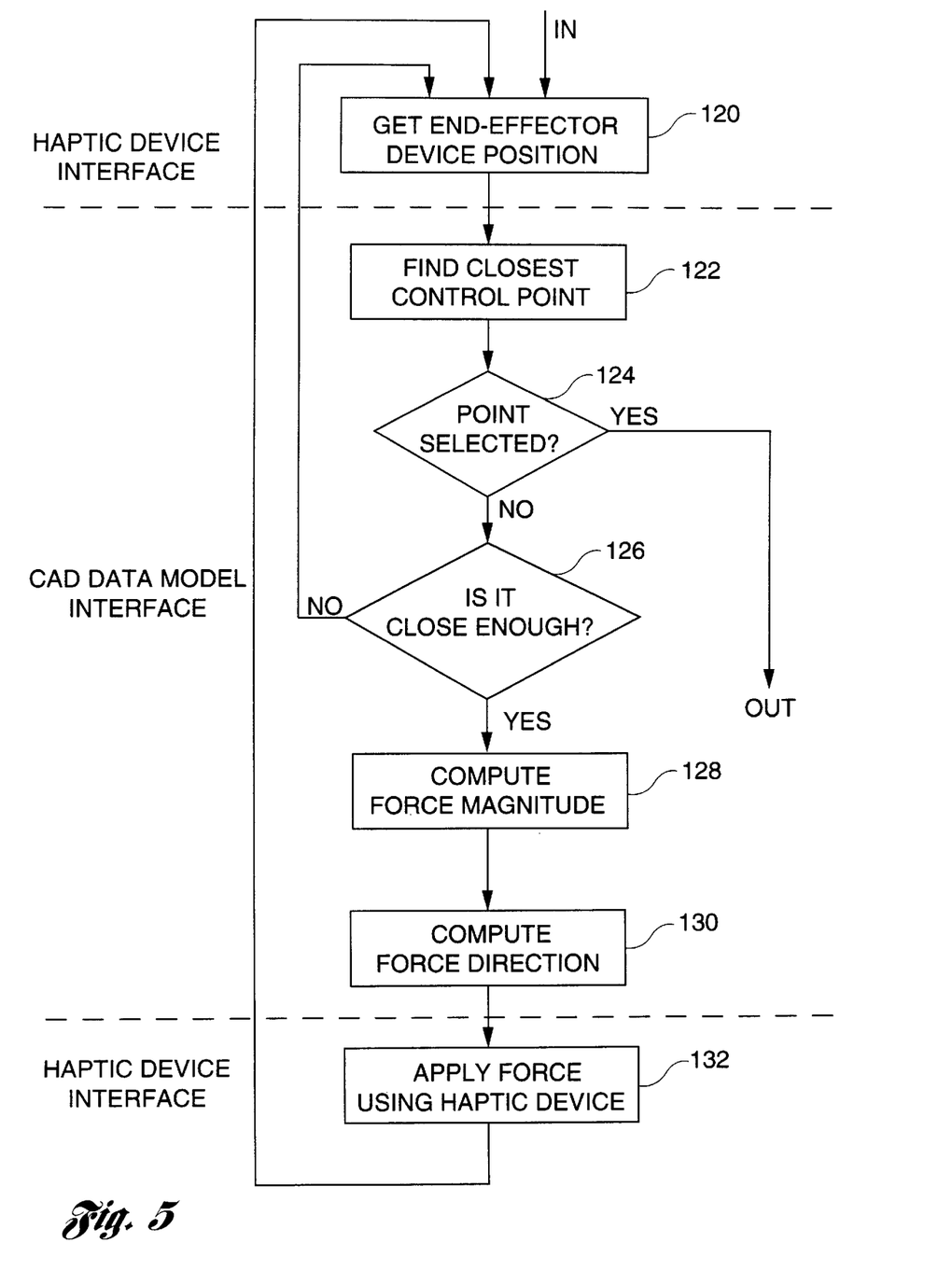
FIG. 5 is a flow diagram illustrating the general sequence of steps associated with the control point selection of the present invention.

The steps associated with selecting an input parameter are described in greater detail in conjunction with the flow diagram of FIG. 5. The position of the end-effector 12, or haptic device 14, is obtained, as shown at block 120, indicating a pointer position of the user, UP.

The closest control point, $P_{closest}$, to UP is determined, as shown at block 122. A determination is then made as to whether or not the user has selected this control point, as shown at conditional block 124. This determination is made based on whether or not an input signal has been received indicating selection of the control point, as evidenced by mouse clicks, keystrokes or button events. If an input signal is received, this point is identified as $P_{selected}$ and the routine is exited.

If the user has not selected this control point, the method proceeds to determine if the UP is inside the $P_{closest}$ gravitational sphere, as shown at conditional block 126. If not, the method returns to block 120.

If the UP is inside the corresponding gravitational sphere of $P_{closest}$, the method proceeds to compute the force magnitude to be applied to the operator via the haptic device 14, as shown at block 128. The force magnitude is determined according to the following:

$$F_{mag} = \begin{cases} 0 & \text{if } d_{UP} > Pull_{area} \\ K_{pull} \dfrac{Pull_{area} - d_{UP}}{Pull_{area} - Pull_{zero}} & \text{if } Pull_{zero} < d_{UP} \leq Pull_{area} \\ K_{pull} \dfrac{d_{UP}}{Pull_{zero}} & \text{if } d_{UP} \leq Pull_{zero} \end{cases}$$

where, $$d_{UP} = \|P_{closest} - UP\|_2.$$

The force magnitude, plotted as a function of distance, $d_{UP}$, is shown in FIG. 4. The potential energy field associated with such a force, $P = \int F(d_{UP}) d_{UP}$, is similar to a gravity well. The minimum that is located in correspondence to the closest control point acts as an equilibrium point toward which the haptic device 14 gently pulls the operator's hand.

The direction of the force is computed next, as shown at block 130. The direction of the force is determined according to the following:

$$F = F_{mag} \left( \frac{P_{closest_x} - UP_x}{d_{UP}}, \frac{P_{closest_y} - UP_y}{d_{UP}}, \frac{P_{closest_z} - UP_z}{d_{UP}} \right)$$

Finally, the force is applied to the haptic device 14 in order to pull the operator's hand, as shown at block 132. Thus, the control point selection step helps an operator to select a point he/she wishes to edit.

Figure 6:
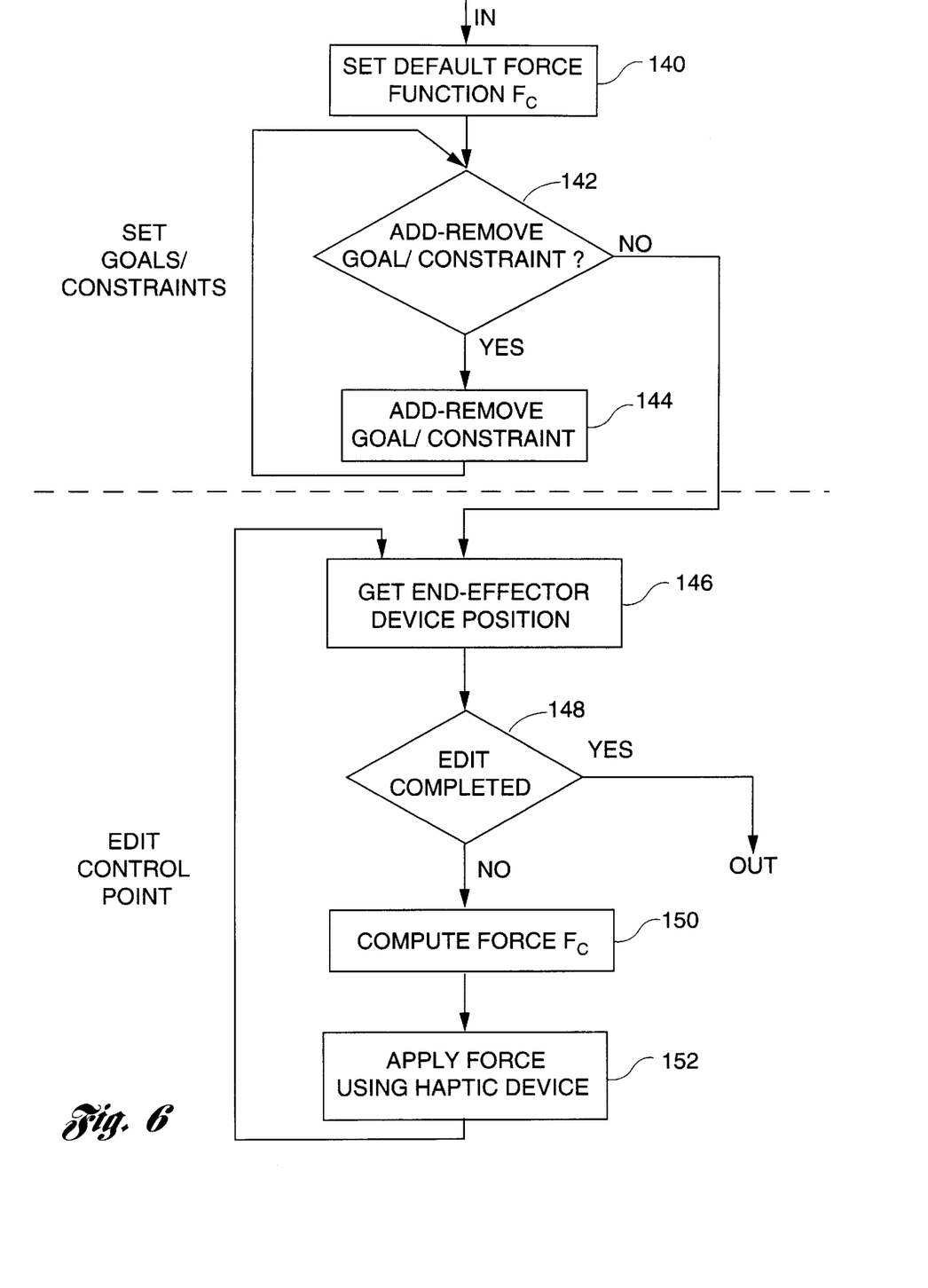
FIG. 6 is a flow diagram illustrating the general sequence of steps associated with the control point editing process of the present invention.

FIG. 6 is a flow diagram associated with control point editing step of the present invention. Design goals or constraints are initially defined as a function $F_C(UP, P_{original})$ of the haptic device position, UP, and the original location of the selected control point, $P_{original}$, in order to guide the operator in editing the control point, as shown at block 140. A simple spring-like constraint function may be utilized to provide some feedback to the operator. Thus, as a default, $$F_c = K_c \|P_{original} - UP\|_2 \left( \frac{P_{original_x} - UP_x}{d_{UP}}, \frac{P_{original_y} - UP_y}{d_{UP}}, \frac{P_{original_z} - UP_z}{d_{UP}} \right)$$

where, $K_C$ corresponds to a spring constant for the constraint.

Thus, when using an active force feedback interface it is possible to apply force feedback that "pulls" the operator's hand to a position that maximizes a particular design goal. The instance described above utilizes minimum modification of the object as a particular design goal via the spring-like constraint function. However, other design goals may be substituted. For example, if the goal is to keep curvature in a specific range while the operator is editing the surface, the operator does not need to monitor the curvature value by looking at some flags/indices on the screen, instead the parameter being controlled must be moved according to the force applied to the designer's hand in order to achieve optimum curvature. The designer can therefore concentrate on other keys issues of the design. Similarly, if the task is to move a NURBS control point from one location to another, staying inside a certain region or following a family of curves, force feedback can be applied to prevent the operator from violating these constraints. Furthermore, if the designer wishes to manipulate the rotation of the object, the force feedback may be used to indicate the object's upright or natural orientation.

If the operator wishes to change the constraints, he/she may do so, as shown at conditional block 142 and block 144.

The editing procedure continues by determining the position of the end-effector 12, as shown at block 146. If the edit is not completed, the force $F_C$ is calculated, as shown at conditional block 148 and block 150. The corresponding force is then applied to the operator via the haptic device 14, as shown at block 152. The method proceeds until the edit is completed as evidenced by mouse clicks, keystrokes, button events, or other events associated with the task.

The user friendly, more efficient CAD modeling environment of the present invention is a key to a shorter and higher quality design cycle. The same motion used in the real world to grab, move and manipulate objects is used in the CAD environment, while preserving the high quality hand-eye coordination of a mouse-flat screen interface. The force feedback interface reduces the overload of information that is graphically represented to the user, while providing new cues via haptic forces.

While the best modes for carrying out the invention have been described in detail, those familiar with the art to which this invention relates will recognize various alternative designs and embodiments for practicing the invention as defined by the following claims.

What is claimed is:

1. A method for allowing a user to manipulate a three-dimensional object in a computer-aided design (CAD) environment utilizing a force feedback interface, the three-dimensional object having a plurality of input parameters defining a shape associated therewith, the method comprising:

defining a first pull area around each of the plurality of input parameters defining the object, wherein the first pull area has an increasing force associated therewith to generate a field of attraction around the object;

applying the increasing force to the force feedback interface when the force feedback interface is inside the first pull area so as to guide the user in selecting one of the input parameters associated with the object; and manipulating the selected input parameter so as to change the shape of the object in the CAD environment.

2. The method as recited in claim 1 wherein manipulating comprises:

receiving an edit signal from the force feedback interface indicating a desired modification to be performed on the input parameter; and editing the input parameter according to the edit signal so as to edit the shape of the three-dimensional object in the CAD environment.

3. The method as recited in claim 2 wherein the object is associated with predetermined design constraints and wherein the method further includes defining a constraint model based on the design constraints and wherein receiving the edit signal includes limiting the edit signal according to the constraint model so as to edit the input parameter within the design constraints.

4. The method as recited in claim 3 wherein defining the constraint model includes defining a spring model.

5. The method as recited in claim 1 wherein applying the increasing force includes determining a position of the force feedback interface.

6. The method as recited in claim 5 wherein applying the increasing force further includes determining a force magnitude based on the first pull area and the position of the force feedback interface.

7. The method as recited in claim 6 wherein applying the increasing force further includes determining a force direction based on the first pull area and the position of the force feedback interface.

8. The method as recited in claim 1 wherein the plurality of input parameters are control points of a Non-Uniform Rational B-Spline (NURBS) surface.

9. A method for allowing a user to manipulate a three-dimensional object in a computer-aided design (CAD) environment utilizing a force feedback interface, the three-dimensional object having a plurality of input parameters defining a shape associated therewith, the method comprising:

defining a first pull area around each of the plurality of input parameters defining the object, wherein the first pull area has an increasing force associated therewith to generate a field of attraction around the object;

applying the increasing force to the force feedback interface when the force feedback interface is inside the first pull area so as to guide the user in selecting one of the input parameters associated with the object; and manipulating the selected input parameter so as to change the shape of the object in the CAD environment, wherein defining the first pull area further includes defining a second pull area within each of the first pull areas having a decreasing force associated therewith within a predetermined range from each of the plurality of input parameters so as to ensure stability in selecting one of the input parameters.

10. A system for allowing a user to manipulate a three-dimensional object in a computer-aided design (CAD) environment utilizing a force feedback interface, the three-dimensional object having a plurality of input parameters defining a shape associated therewith, the system comprising:

a processor operative to define a first pull area around each of the plurality of input parameters defining the object, wherein each of the first pull areas has an increasing force associated therewith to generate a field of attraction around the object;

a controller for applying the increasing force to the force feedback interface when the force feedback interface is inside the first pull area so as to guide the user in selecting one of the input parameters associated with the object; and the processor further operative to manipulate the selected input parameter so as to change the shape of the object in the CAD environment.

11. The system as recited in claim 10 wherein the processor is further operative to receive an edit signal from the force feedback interface indicating a desired modification to be performed on the input parameter and to edit the input parameter according to the edit signal so as to edit the shape of the three dimensional object in the CAD environment.

12. The system as recited in claim 11 wherein the object is associated with predetermined design constraints and wherein the processor is further operative to define a constraint model based on the design constraints and wherein the processor is further operative to limit the edit signal according to the constraint model so as to edit the input parameter within the design constraints.

13. The system as recited in claim 12 wherein the design constraints include a spring model.

14. The system as recited in claim 10 wherein the processor is further operative to determine a position of the force feedback interface.

15. The system as recited in claim 14 wherein the processor is further operative to determine a force magnitude based on the first pull area and the position of the force feedback interface.

16. The system as recited in claim 15 wherein the processor is further operative to determine a force direction based on the first pull area and the position of the force feedback interface.

17. The system as recited in claim 10 wherein the plurality of input parameters are control points of a Non-Uniform Rational B-Spline (NURBS) surface.

18. A system for allowing a user to manipulate a three-dimensional object in a computer-aided design (CAD) environment utilizing a force feedback interface, the three-dimensional object having a plurality of input parameters defining a shape associated therewith, the system comprising:

a processor operative to define a first pull area around each of the plurality of input parameters defining the object, wherein each of the first pull areas has an increasing force associated therewith to generate a field of attraction around the object;

a controller for applying the increasing force to the force feedback interface when the force feedback interface is inside the first pull area so as to guide the user in selecting one of the input parameters associated with the object; and the processor further operative to manipulate the selected input parameter so as to change the shape of the object in the CAD environment, wherein the processor is further operative to define a second pull area within each of the first pull areas having a decreasing force associated therewith within a predetermined range from each of the plurality of input parameters so as to ensure stability in selecting one of the input parameters.

19. A method for manipulating a three-dimensional object in a computer-aided design (CAD) environment utilizing a force feedback interface, the three-dimensional object having a plurality of input parameters defining a shape, location and orientation associated therewith, the method comprising;

defining a first gravitational sphere around each of the plurality of input parameters having an increasing force associated therewith;

defining a second gravitational sphere within each of the first gravitational spheres having a decreasing force associated therewith within a predetermined range from each of the plurality of input parameters;

applying the increasing force to the force feedback interface based on the first gravitational spheres; and receiving an input signal from the force feedback interface based on the applied force indicating selection of one of the plurality of input parameters.

20. A system for manipulating a three-dimensional object in a computer-aided design (CAD) environment utilizing a force feedback interface, the three-dimensional object having a plurality of input parameters defining a shape, location and orientation associated therewith, the system comprising:

a processor operative to define a first gravitational sphere around each of the plurality of input parameters having an increasing force associated therewith and further operative to define a second gravitational sphere within each of the first gravitational spheres having a decreasing force associated therewith within a predetermined range from each of the plurality of input parameters;

a controller for applying the increasing force to the force feedback interface based on the first gravitational spheres; and the processor further operative to receive an input signal from the force feedback interface based on the applied force indicating selection of one of the plurality of input parameters.

* * * * *